United States Patent Office 3,201,361
Patented Aug. 17, 1965

3,201,361
RUBBER COMPOUNDED WITH A RELEASING COMPOSITION CONTAINING A BRANCHED CHAIN ALCOHOL AND STEARIC ACID
Erwin Aron, Paterson, N.J., assignor to Technical Processing, Inc., Paterson, N.J., a corporation of New Jersey
No Drawing. Filed June 6, 1960, Ser. No. 33,901
13 Claims. (Cl. 260—23.7)

This application is a continuation-in-part application of my copending U.S. application Serial No. 653,303, filed April 17, 1957, and now issued as U.S. Patent No. 2,939,898.

This invention relates to a novel mold releasing composition and, more particularly, it pertains to a releasing composition for molding of rubber items.

In molding rubber it is necessary to avoid adherence of the rubber itself to the surface of the mold. Conventionally, for this purpose a mold releasing agent is applied to the surface of the compounded rubber or to the mold prior to the molding operation. Such an operation is tedious and costly, considering that each individual item must be coated manually with the mold releasing agent. Another disadvantage in this technique is that the molds must be cleaned of accumulated deposits of the releasing agent. Also in deep cavity molding the mold releasing agent tends to promote the formation of flow cracks. Thus it is apparent that there is need for a mold releasing composition which is easily applied and requires little or no cleaning of mold surfaces and avoids the inherent disadvantages of surface coating.

In my co-pending application I disclosed and claimed a novel releasing composition which was especially suitable for rubber molding and which eliminated the need for employing the tedious and costly practices heretofore used.

I have now discovered improved mold releasing compositions which are not only vastly superior to the prior art compositions previously mentioned but which also have certain distinct advantages over the compositions disclosed and claimed in my co-pending application when employed for certain specific purposes as will be discussed in greater detail hereinafter. The mold releasing compositions of this invention comprise a cohesive homogeneous mixture of an oleate salt of a metal selected from the group consisting of zinc, magnesium, lead and calcium, the oleate salt being in an amount such that the oleic acid equivalent thereof amounts to about 11 to 16% of the total mixture, about 50 to about 60% of a lubricant selected from the group consisting of petroleum jelly and paraffin wax, about 4 to about 6% monohydric branched-chain alkylols having from about 8 to about 18 carbon atoms, about 4.5 to about 6.7% potassium stearate and about 14 to about 26% excess stearic acid. The percentages specified above are on a total weight basis based on 100 parts of the mold release agent.

Mold releasing compositions of this invention are prepared by reacting an oxide, hydroxide or carbonate of zinc, magnesium, calcium or lead with oleic acid in approximately stoichiometric proportions or in slight excess of about .25 to about 2% oleic acid based on the total weight of the composition to produce the corresponding oleate salt. The temperature for this reaction may be from about 90° to about 130° C., preferably about 95° to about 105° C. This temperature range also applies to the other steps of preparing the cohesive homogeneous mixture. After the oleate salt is formed, the lubricant and alkylol are added and the total mixture is agitated until the ingredients are uniformly mixed. Stearic acid in the required amount is then admixed into the reaction mass. The oxide, hydroxide or carbonate of potassium is then added, and the mixture is agitated until a homogeneous mixture is obtained. By producing a cohesive homogeneous mixture, the initial ingredients are combined to give the composition qualities useful for mold releasing. The combination of ingredients may result from double decomposition between the oleate salt and the stearate salt, and from stearic acid reacting with potassium stearate to give the acid salt as well as dispersion and/or solution of components. In the mixture, part of the stearic acid may be free of association with the stearate salt. Hence, excess stearic acid designates the amount of stearic acid in excess of that required to produce the neutral salt, potassium stearate.

The type of starting materials and the way in which they are mixed to prepare the cohesive homogeneous mixture may be varied. For example, as starting materials the oleate salt and the acid potassium salt of stearic acid $C_{17}H_{35}COOK \cdot C_{17}H_{35}COOH$ may be used. The total ingredients can be combined as a single step and then heated with agitation until the homogeneity is obtained. The preferred method of preparing the cohesive homogeneous mixture is to first react the inorganic compound of zinc, magnesium, calcium or lead with oleic acid, then therewith mix the lubricant and alkylol and then add the stearic acid. The final step of the process is the addition of the potassium compound. It is essential that the composition be formulated into a homogeneous cohesive mixture since I have found that the separate ingredients, even in the proportions stated, do not perform satisfactorily.

It is essential that each and every ingredient of the homogeneous cohesive mixture be employed in the mold releasing compositions of this invention if the composition is to be used effectively. I have found that the omission of a single one of these ingredients adversely effects the composition. For example the excess stearic acid is an essential component of the composition and if an excess of stearic acid is not present the composition is not useful for commercial purposes. The role of the excess stearic acid is not understood. By comparison with mixtures not having excess stearic acid, it is apparent that the acid cooperates with the other components of the mixture to give a material which is exceptionally better in penetrating the rubber and which is also more stable so that the releasing composition as a whole distributes uniformly in the rubber.

Petroleum jelly is the preferred choice of a lubricant. The superiority of petroleum jelly over paraffin wax, is shown in the condition of the molding surface after use and the ease with which the molded article separates from the mold. The reason for the petroleum jelly functioning better is not known. A typical petroleum jelly has a melting point of about 115° to 130° F. and preferably about 120° to 125° F. Paraffin waxes of petroleum origin having a melting point of about 110 to about 135° F. are useful.

The branch chain alkylols used in making the homogeneous mixture act as a binding agent for the other ingredients in the composition. This function is particularly noticeable at elevated temperatures normally encountered in use. The branched chain alkylols are aliphatic alcohols having from 8 to about 18 carbon atoms. Specific examples of these alkylols are 2-ethylhexanol, 5-ethyl-nonanol-2, 7-ethyl-2 methylundecanol-4, 3,9-diethyltridecanol-6, etc.

The mold releasing composition is incorporated into rubber during the compounding stage. In rubber compounding, raw rubber is first masticated to make it more pliable and then it is admixed with other compounding ingredients, such as pigments, i.e., carbon black; fillers, e.g. the oxides of zinc, magnesium, lead or calcium, vulcanizing agents, e.g. sulfur; etc. The mold releasing composition can be mixed with these additives before incorporation into the rubber or the releasing agent can be added to the compounded rubber. In any event, the releasing agent is mixed thoroughly with the compounded rubber to effect uniform distribution. In general, about 0.25 to about 0.75% of the mold releasing composition, based on the total weight of the rubber item, is employed. These amounts can be employed whether the rubber is natural, synthetic, or of the reclaimed type.

There are additional advantages to be gained from using the mold releasing agent. For example, it is found that the mold releasing agent facilitates blending or mixing of pigments such as carbon black and other difficult-to-mix fillers in the compounding stage. Further, mixing or compounding is quickened by the presence of the mold releasing composition; extrusion operations are smoother and quicker; scorching and devulcanization are inhibited; the rubber cure is accelerated; and the mold releasing agent does not grain out in the finished rubber item. In respect to the molded rubber item, the mold releasing composition inhibits blooming, improves the aging qualities of the rubber item, increases the tensile strength of the highly filled stocks, improves the resistance of rubber to ozone deterioration, and imparts sharper color definition and retention. In regard to production, the use of mold releasing composition results in increased production, eliminates the need for stopping production to clean the molds, eliminates the manual labor involved in surface application of conventional mold releasing agents, decreases almost entirely the number of rejects of molded rubber articles formerly obtained and enables the molds to be stored without any further preparation. It is apparent from the foregoing advantages that marked improvements are achieved by the compositions of the present invention over compositions employed in the prior art.

As mentioned previously the compositions of this invention have certain distinct advantages over the compositions disclosed in my co-pending application Serial No. 653,303, now issued as U.S. Patent No. 2,939,898. For example I have found that the compositions of this invention are more easily liquified over rubber mills and are more quickly absorbed into the rubber mass than the compositions of my co-pending application. Such rapid admixture is many times very important since longer mixing cycles many times incur undesirable breakdown of the rubber. Moreover the compositions of this invention may be kept at temperatures just above the composition of melting temperatures without even traces of separation of the ingredients of the composition being noticeable as sometimes occur with the compositions of my co-pending application. This extra stability is particularly desirable when uncured rubber stocks are stored for long periods of time before final processing. This increased stability is also of considerable importance in rubber formulations containing large amounts of plasticizing oils and resins and large amounts of absortive fillers which tend to selectively absorb parts of the compositions of my co-pending application thus reducing their effectiveness. Examples of the mold releasing compositions of this invention are illustrated below.

*Example I*

| | G. |
|---|---|
| ZnO | 1.5 |
| Oleic acid | 12.0 |
| 2-ethylhexanol | 4.0 |
| Paraffin wax | 58.0 |
| KOH, 45% | 2.5 |
| Stearic acid | 29.5 |

*Example II*

| | G. |
|---|---|
| ZnO | 1.7 |
| Oleic acid | 13.5 |
| 7-ethyl-2-methylundecanol-4 | 5.0 |
| Petrolatum | 55.0 |
| KOH, 45% | 2.2 |
| Stearic acid | 24.0 |

*Example III*

| | G. |
|---|---|
| ZnO | 1.9 |
| Oleic acid | 15.0 |
| 3,9-diethyltridecanol-6 | 6.0 |
| Petrolatum | 50.0 |
| Stearic acid | 26.0 |
| KOH, 45% | 2.4 |

*Example IV*

A rubber composition was prepared according to the following formula.

| | G. |
|---|---|
| Buna N rubber | 400 |
| ZnO | 20 |
| Resin | 8 |
| Channel black | 200 |
| Sulfur | 7 |
| Altax (2,2′ benzothiazoledisulfide) | 5 |
| Stearic acid | 4 |
| Dibutyl phthalate | 40 |

This rubber composition was divided into four equal parts. 1 g. of the mold releasing agent of Examples I, II and III were added respectively to three of the portions of the rubber composition. The fourth portion served as control. The samples were cured for ten minutes at 320° F. in clean molds without external agents. The samples which had my mold release compositions incorporated therein were easily removed from the molds. The control sample showed considerable adhesion to the mold.

Having thus provided a description of the invention along with specific examples thereof, it should be understood that no undue limitations or restrictions are to be imposed by reason thereof but that the present invention is defined by the appended claims.

I claim:
1. A composition of matter comprising a homogeneous mixture of an oleate salt of a metal selected from the group consisting of zinc, magnesium, lead and calcium, the oleate salt being in an amount such that the oleic acid equivalent thereof amounts to about 11 to 16% of the total mixture, about 50 to about 60% petroleum jelly, about 4 to about 6% monohydric branched-chain alkylol having from about 8 to about 18 carbon atoms, about 4.5 to about 6.7% potassium stearate, and about 14 to about 26% free stearic acid.

2. A composition of matter comprising a homogeneous mixture of an oleate salt of a metal selected from the group consisting of zinc, magnesium, lead and calcium, the oleate salt being in an amount such that the oleic acid equivalent thereof amounts to about 11 to 16% of the total mixture, about 50 to about 60% of a lubricant selected from the group consisting of petroleum jelly and paraffin wax, about 4 to about 6% monohydric branched-chain alkylol having from about 8 to about 18 carbon atoms, about 4.5 to about 6.7% potassium stearate, and about 14 to about 26% free stearic acid.

3. A composition of matter comprising a homogeneous mixture of zinc oleate in an amount such that the oleic acid equivalent thereof amounts to about 11 to 16% of the total mixture, about 50 to about 60% of a lubricant selected from the group consisting of petroleum jelly and paraffin wax, about 4 to about 6% monohydric branched-chain alkylol having from about 8 to about 18 carbon atoms, about 4.5 to about 6.7% potassium stearate, and about 14 to about 26% of free stearic acid.

4. A composition of matter comprising a homogeneous mixture of zinc oleate in an amount such that the oleic acid equivalent thereof amounts to about 11 to 16% of the total mixture, about 50 to about 60% of petroleum jelly, about 4 to about 6% monohydric branched-chain alkylol having from about 8 to about 18 carbon atoms, about 4.5 to about 6.7% potassium stearate, and about 14 to about 26% of free stearic acid.

5. The composition of claim 4 wherein the alkylol is 2-ethylhexanol.

6. The composition of claim 4 wherein the alkylol is 5-ethylnonanol-2.

7. In the compounding of raw rubber the improvement which comprises adding to said raw rubber a homogeneous mixture of an oleate salt of a metal selected from the group consisting of zinc, magnesium, lead and calcium, the oleate salt being in an amount such that the oleic acid equivalent thereof amounts to about 11 to 16% oleic acid based on the total mixture, about 50 to about 60% of a lubricant selected from the group consisting of petroleum jelly and paraffin wax, about 4 to about 6% monohydric branched-chain alkylol having from about 8 to about 18 carbon atoms, about 4.5 to about 6.7% potassium stearate, and about 14 to about 26% of free stearic acid.

8. In the compounding of rubber the improvement which comprises adding to said rubber a homogenous mixture of zinc oleate in an amount such that the oleic acid equivalent thereof amounts to about 11 to 16% based on the total mixture, about 50 to about 60% petroleum jelly, about 4 to about 6% monohydric branched-chain alkylol having from about 8 to about 12 carbon atoms, about 4.5 to about 6.7% potassium stearate, and about 14 to about 26% free stearic acid.

9. The process of claim 8 wherein the homogenous mixture comprises about .25 to about .75% of the total rubber.

10. The process which comprises reacting a salt-forming compound selected from the group consisting of the hydroxide, oxide and carbonate of a metal selected from the group consisting of zinc, calcium, magnesium and lead with oleic acid at a temperature of about 90° to 130° C. to produce the oleate salt of the selected metal; adding to said oleate salt a lubricant selected from the group consisting of petroleum jelly and paraffin wax, a monohydric branched-chain alkylol having from about 8 to about 18 carbon atoms, and stearic acid; and then adding to the resultant mixture containing excess stearic acid a compound selected from the group consisting of the hydroxide, oxide and carbonate of potassium to produce a homogeneous composition containing by weight oleate salt in an amount such that the oleic acid equivalent thereof amounts to about 11 to 16% by weight of the composition, about 50 to 60% lubricant, about 4 to 6% fatty alcohol, about 4.5 to 6.7% potassium stearate, and about 14 to 26% free stearic acid.

11. The process of claim 10 wherein the salt-forming compound is zinc hydroxide and the temperature of reaction is maintained at about 95 to 105° C.

12. The process of claim 10 wherein the salt-forming compound is zinc oxide and the temperature of reaction is maintained at about 95 to 105° C.

13. The process of claim 10 wherein the salt-forming compound is zinc carbonate and the temperature of reaction is maintained at about 95 to 105° C.

References Cited by the Examiner
UNITED STATES PATENTS 2,939,898   6/60   Aron _____ 260—23.7

OTHER REFERENCES

Gregory: "Use and Applications of Chemical and Related Materials," vol. II, pp. 236–237, Reinhold Publishing Corp., New York (1944).

LEON J. BERCOVITZ, *Primary Examiner.*

A. D. SULLIVAN, MILTON STERMAN, *Examiners.*